United States Patent [19]
Nudds et al.

[11] Patent Number: 5,265,567
[45] Date of Patent: Nov. 30, 1993

[54] EMD LOCOMOTIVE ENGINE PROTECTIVE DEVICES OVERRIDE FOR USE DURING AUTOSTART PROCEDURE

[75] Inventors: J. Thomas Nudds; Derek L. Shipley; Aldo F. Liberatory, all of London, Canada

[73] Assignee: ZTR Control Systems, Minneapolis, Minn.

[21] Appl. No.: 894,528

[22] Filed: Jun. 5, 1992

[51] Int. Cl.[5] ............................................. F02B 77/00
[52] U.S. Cl. ........................... 123/198 D; 123/179.17
[58] Field of Search ........... 123/41.15, 179.17, 198 D, 123/198 DC

[56] References Cited

U.S. PATENT DOCUMENTS

| | | | |
|---|---|---|---|
| 4,413,595 | 11/1983 | Potts, Jr. | 123/142.5 R |
| 4,452,196 | 6/1984 | Indra | 123/198 DB |

OTHER PUBLICATIONS

Harmon Industries Automatic Start-Up/Shut Down System Manual-Emd Version Dated Aug. 1986.
Emd Engine Maintenance Manual, First Edition (Apr. 1978), Section 13 and 2nd Edition (1984), Copies of which are not available at this time, except for one page of section 13 of the 1978 Edition.

*Primary Examiner*—Noah P. Kamen
*Attorney, Agent, or Firm*—Vidas, Arrett & Steinkraus

[57] ABSTRACT

Method and apparatus for automatically starting an EMD locomotive engine.

18 Claims, 3 Drawing Sheets

EMD LOCOMOTIVE ENGINE PROTECTIVE DEVICES OVERRIDE FOR USE DURING AUTOSTART PROCEDURE

BACKGROUND OF THE INVENTION

1. Field of The Invention

This invention relates to EMD locomotive engine protective devices and more particularly to overriding the protective devices in an EMD locomotive engine during a computer controlled automatic engine shutdown and restart system.

2. Description of Related Art

It is a generally recognized fact that locomotives spend 40-50% of their time idling, (Assoc. of American Railroad, Report No. R-506). In order to prevent the wasting of thousands of gallons of fuel, many locomotives are now equipped with automatic engine shutdown and restart system. These are computer controlled systems which monitor a variety of parameters such as: reverser position; throttle position; air brake cylinder pressure; engine coolant temperature; ambient air temperature; battery voltage and battery charging amperage. By monitoring these parameters, the computer program can safely shut off the locomotive engine while it is idling and automatically restart the engine in accordance with program parameters. By cutting idle time, the railroad saves as much as $15,000 a year for each equipped locomotive. Also, the system reduces the particulate gaseous and noise emissions generated by idling locomotives as well as cutting down on wear and tear on the locomotive engine. Applicant manufactures and sells an automatic shutdown or restart system called "ZTR SmartStart ™". The ZTR SmartStart ™ system was implemented in connection with locomotives equipped with Caterpillar diesel engines in February of 1991. Because Caterpillar diesel engines utilize unique electronic governor and engine block designs, they lend themselves readily to automatic shutdown and restart.

When applicant attempted to adapt the ZTR SmartStart System to work in connection with Electro-Motive division of General Motors locomotive engines (EMD) applicant discovered that certain protective devices on these engines made automatic shutdown and restarts more difficult on this type of engine.

The first edition (April 1978), sec. 13 and second edition (1984) of the EMD Engine Maintenance Manual discusses these protective devices in detail. The EMD Maintenance Manual is hereby incorporated by reference. To briefly summarize, the protective devices consist of a mechanical crankcase pressure detector and a low water detector. If the device detects a positive crankcase pressure or low coolant level, the appropriate detector senses this condition and initiates engine shutdown. To manually start an EMD engine, on a consistent basis, the engineer may be required to override the crankcase pressure/low water device by manually holding in one or both buttons on the device, for a predetermined amount of time, to prevent them from tripping and initiating a shutdown. Once the engine water pressure, engine oil pressure and crankcase vacuum have stabilized the reset buttons can be released and thereafter operate normally to protect the engine in case of an abnormal engine condition. It is due to the necessity of having to manually override these reset buttons that an automatic shutdown start up system is difficult to implement on an EMD engine.

Another difficulty that arose in implementing an automatic shutdown start up system was replacing the manual movement of the "layshaft". During a manual engine start of the standard EMD engine, the engineer while cranking the engine will push on the governor "layshaft" which moves the injector control arm. After the engine is running by itself the engineer will hold in (if necessary) either one or both of the engine protection buttons (discussed in the previous paragraph) until water has filled the system and the engine oil pressure has stabilized.

Applicant is aware of one prior attempt to create an automatic start up/shutdown system in connection with an EMD engine. This system was created by Harmon Industries in late 1986. The Harmon Industries Automatic Start Up/Shutdown System Manual—EMD Version (dated August 1986) discloses using air pressure to mechanically actuate a rod which depresses the low water protector reset button during auto start. A mechanical approach as disclosed by Harmon Industries is inherently prone to break down. Also, anecdotal evidence indicates that the Harmon EMD system was unreliable. Harmon also used an air pressure driven mechanical arm to push on the injector control rack, thereby simulating an engineer mechanically moving the "layshaft". Again, this mechanical approach is inherently prone to break down.

SUMMARY OF INVENTION

Applicant has adapted their automatic engine shutdown and restart system to work with EMD engines by disabling or overriding the protective devices used in EMD engines during autostart and/or autostop. Applicants approach is much more reliable than the mechanical approach of Harmon and works with all EMD engines including rebuilt EMD engines which often operate in a slightly different fashion than other EMD engines due to rebuild tolerances being lower.

The crankcase pressure/low water protection device utilizes a combination of air, water and spring pressure differentials to actuate diaphragms inside the protection device which in turn initiate an engine shutdown.

Specifically, the crankcase pressure detection portion of the device senses a differential between crankcase air pressure on one side of the diaphragm and spring pressure on the other. Positive pressure in the crankcase during operation indicates an abnormal engine condition and creates an air flow in the vent line which causes the diaphragm to move thereby tripping the detector and initiating an engine shutdown.

The low water detection portion senses differentials between water inlet pressure, water outlet pressures and engine air box air pressures. If water pump cavitation should occur, or if the water level should drop causing a pressure differential across the diaphragms, their movement will initiate an engine shutdown.

To override the crankcase pressure detector, during engine start up, applicant has installed a normally open electrically operated solenoid valve in the vent line used to vent air if the crankcase pressure becomes positive. To prevent the diaphragm from moving during auto start up, the solenoid is electrically energized which causes the normally open valve to move to the closed position thereby blocking the air flow to the diaphragm and preventing the diaphragm from moving and the detector from tripping. The solenoid remains energized for approximately one minute during the auto start up sequence. Once the engine auto starts, the solenoid is de-energized and the valve returns to its normally open position to allow the crankcase pressure detector to operate normally.

Similarly, to override the low water pressure detector, applicant has installed a three-way electrically operated solenoid valve in the line which runs from the air box to the low water detector. To prevent the low water detector from tripping during auto start up, the solenoid is electrically energized which causes the three-way valve to move to the open position, blocking the airflow to the detector and venting to atmosphere, thereby bleeding off the air box pressure. This prevents the differential water pressures from ever becoming less than the air box air pressure. This prevents the low water detector from tripping. The solenoid remains energized for approximately one minute during the auto start up sequence. Once the engine auto starts, the solenoid is de-energized and the valve returns to its normal position allowing the airflow to flow to the detector to allow the low water detector to operate normally.

In cases where movement of the injector control rack is required (moving the "layshaft") the ZTR SmartStart ™ program sets a flag to activate this option. If the option is activated the control program waits a predetermined amount of time after beginning to crank the engine. If the engine has not started a solenoid valve or combination of the four solenoid valves in the governor are energized to assist the injector control rack movement. Energizing the valve(s) in the governor releases tension on the injector rack, which in turn allows lower oil pressure to assist the injector rack to move by itself. This simulates the effect of manually moving the "layshaft". The valve(s) in the governor are energized for a predetermined time which varies depending on the model of EMD engine.

DESCRIPTION OF THE PREFERRED EMBODIMENTS

Figure 1:
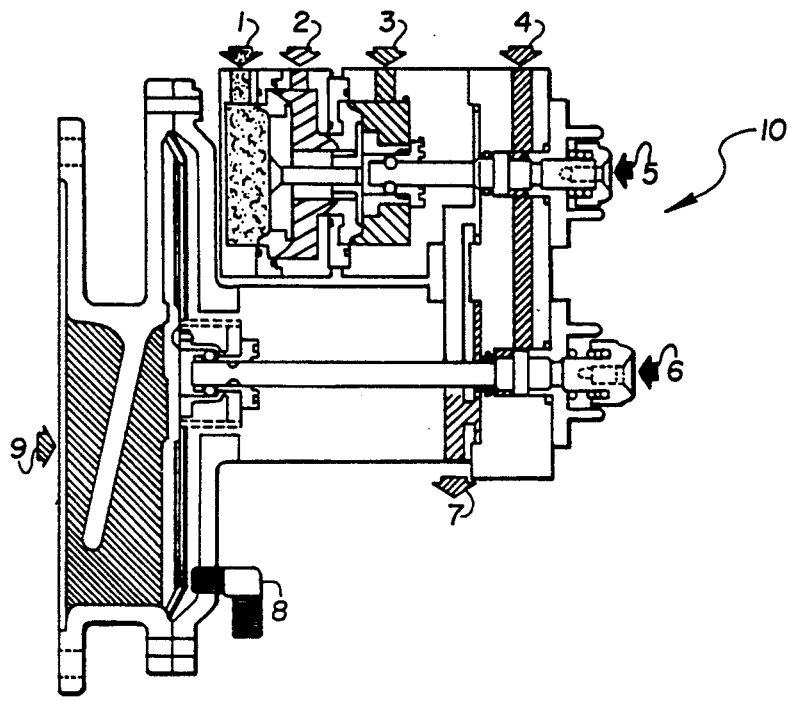
FIG. 1 is a schematic depicting a positive crankcase pressure condition on an EMD engine.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

Referring now to FIG. 1, a schematic representation of the EMD protective devices is shown generally at 10. EMD protective device 10 is included in many locomotives equipped with EMD engines. I will first refer generally to how the protective devices work on an EMD engine with reference to FIGS. 1 and 2 and then describe how applicants' inventive apparatus disables these protective devices during auto start and shutdown when used in connection with their SmartStart ™ automatic engine shutdown and restart system.

As reference numerals 1-9 of FIG. 1 indicate, reference numeral 1 indicates the water pump discharge pressure; reference numeral 2 indicates the water pump inlet pressure; reference numeral 3 indicates the air box pressure; reference numeral 4 indicates the oil in from governor; reference numeral 5 indicates the latch position reference numeral 6 refers to the trip position; reference numeral 7 refers to oil return to crankcase; reference numeral 8 refers to vent elbow; and reference numeral 9 refers to crankcase pressure. This diagram shows the crankcase 9 in a positive pressure condition which causes air flow through vent elbow 8 causing the diaphragm to move which in turn initiates engine shutdown.

Figure 2:
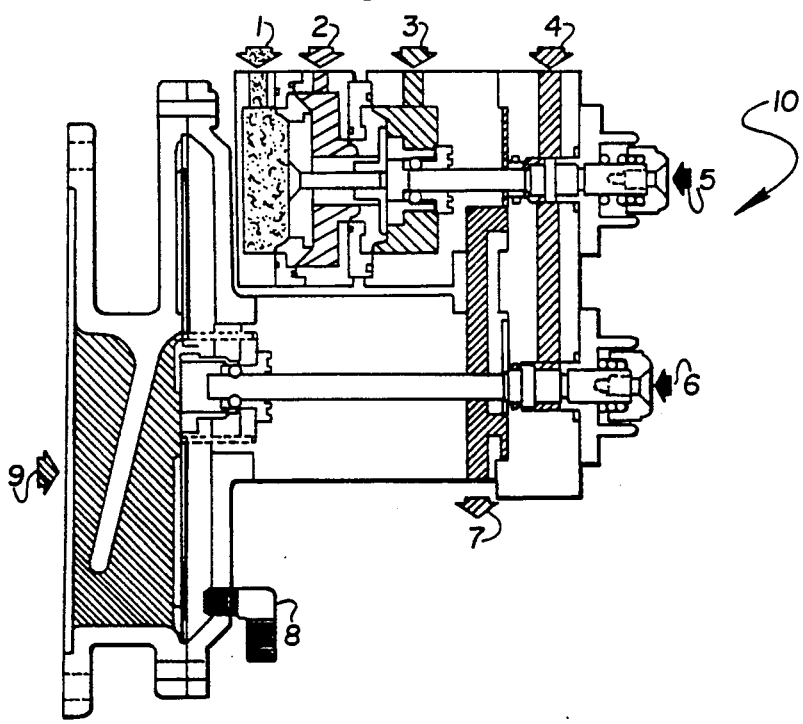
FIG. 2 is a schematic depicting a low water pressure condition on an EMD engine.

Referring now to FIG. 2, the protective device as shown in the low differential water pressure condition in which the crankcase pressure is negative (reference 9) but the differential pressure across the water pump (comparing the pressure between reference numerals 1 and 2) becomes less than the air box pressure (reference numeral 3) a diaphragm (not shown) moves thereby tripping the low water detector and causing the engine to shutdown.

Figure 3:
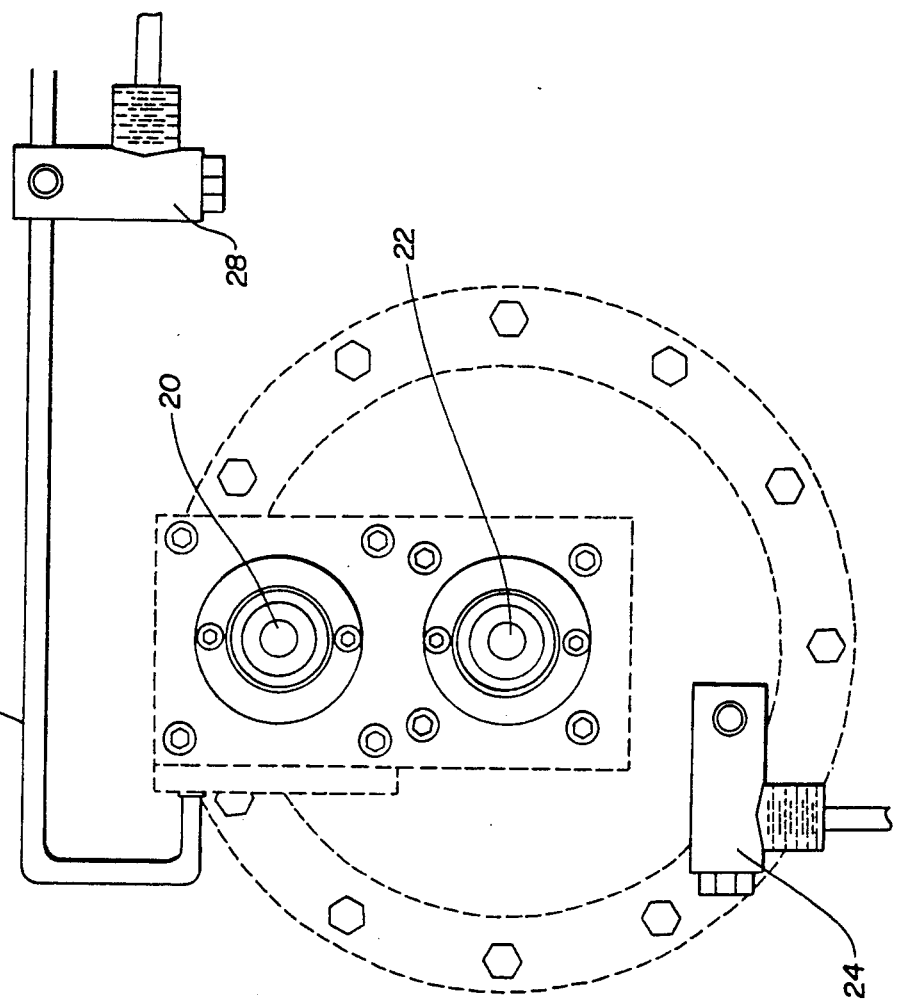
FIG. 3 is a schematic showing the valves which bypass the crankcase pressure detector and the low water detector.

Referring now to FIG. 3, a schematic of the protective device is shown in which reference numeral 20 refers to the low water detector reset button and reference numeral 22 refers to the crankcase pressure detector reset button. To bypass the crankcase pressure detector protective device, a normally open solenoid valve is installed to vent elbow 8 shown in FIGS. 1 and 2. In the preferred embodiment, the solenoid valve used is provided by Ascolectric Ltd. of Ontario, Canada and is referred to as the Red-Hat II two-way Solenoid Valve and is referred to at reference numeral 24. During auto start-up, normally open solenoid valve 24 is closed, thereby preventing air flow through vent elbow 8. This prevents the diaphragm from moving and therefore prevents tripping of the crankcase pressure detector. Solenoid valve 24 is closed electronically for a predetermined time during the autostart sequence and is controlled electronically by the ZTR SmartStart ™ computer control system. In the preferred embodiment the predetermined time is approximately one minute which is sufficient to allow the engine oil pressure to stabilize and the radiator to fill with water. Reference numeral 26 refers to the vent line which vents air if the crankcase pressure 9 becomes positive. A three-way Red-Hat II Ascolectric Solenoid valve is installed in this vent line to override the low water detector during auto start. It should be understood that many different two-way and three-way valves could be utilized in the current invention. The ZTR SmartStart ™ computer control system opens or energizes valve 28 for a predetermined time during auto start, blocking airflow to the detector and venting to atmosphere to allow the air pressure to bleed out of the air box. This prevents the diaphragm from moving, thereby preventing the low water detector from tripping and shutting down the engine. As in the case of valve 24, the predetermined time that valve 28 is opened is approximately one minute. At the end of the predetermined period of time, both valves 24 and 28 return to their normal positions which restores the protective device to its normal function.

Figure 4:
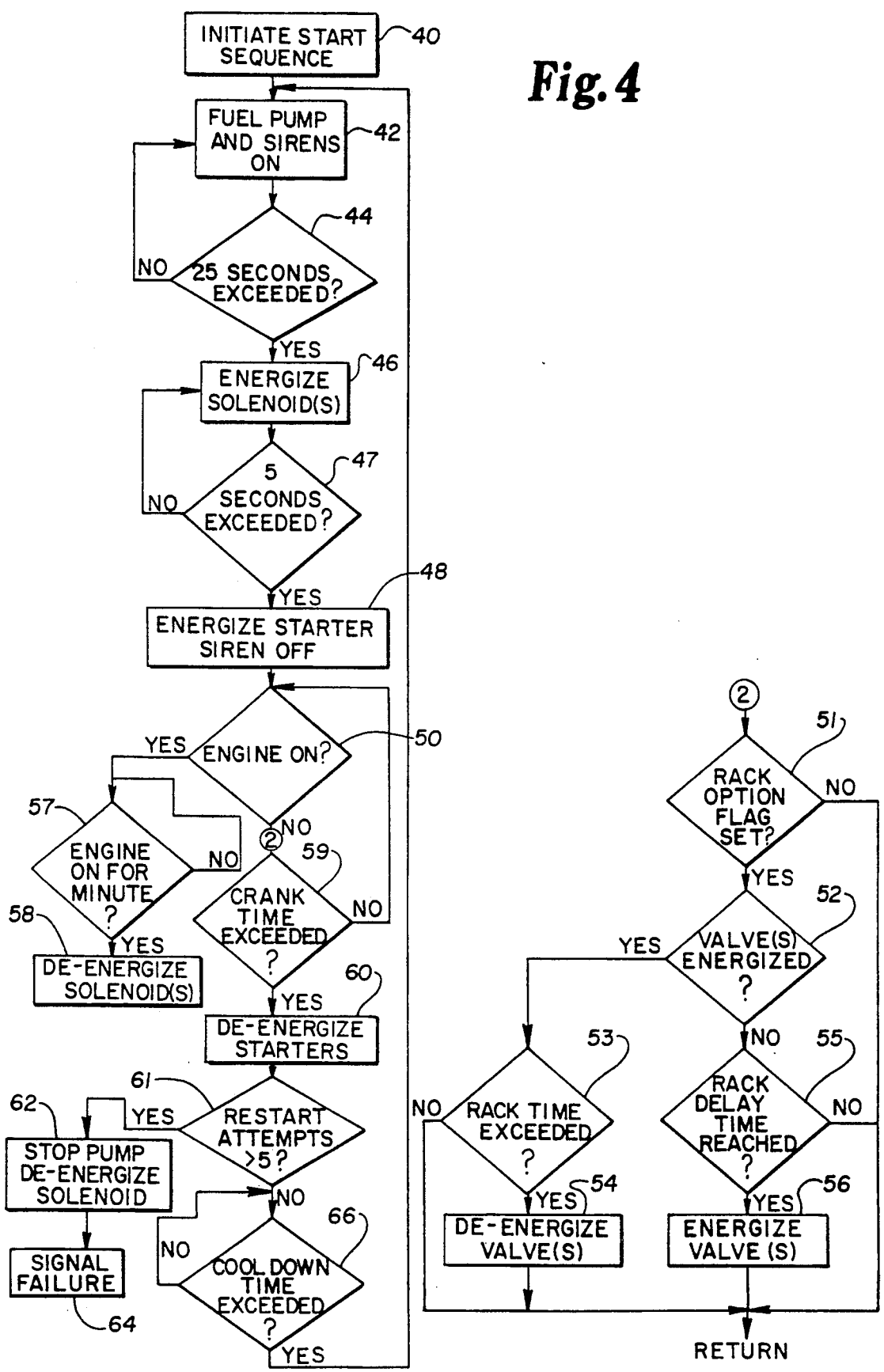
FIG. 4 is a flow chart showing the program operation during auto start up.

Referring now to FIG. 4, a flow chart is shown of the ZTR SmartStart ™ computer control. The computer initiates the start sequence at box 40. At box 42 the fuel pump and sirens turn on. After a period of 25 seconds (reference numeral 44) valves 24 and 28 are moved to their respective non-normal positions (reference numeral 46). After 5 seconds (block 47) the sirens are then turned off at 48 and the starter motors are energized. Once the engine starts, the starters are de-energized. A detector determines if the engine is running at 50. If the engine has been running for greater than one minute, valves 24 and 28 are returned to their normal positions, thereby disabling the override of the EMD protective devices (reference numerals 57 and 58). If the engine is indicated as being off at block 50 and the rack option flag is not set at 51 then the program goes to block 59. If the rack option flag is set at 51 the program determines whether the governors solenoid valves are energized at block 52. Energizing the solenoid valves in the governor releases some of the tension on the governor control of the injector rack. The rack is normally controlled by spring pressure against the governor oil pressure and this spring pressure is controlled by the governor valve condition. The injector rack opens the injectors (simulating moving the layshaft) allowing fuel to be sprayed in the cylinders for combustion. If the valves are energized the program tests to see if the rack time is exceeded at 53. If the rack time is not exceeded the program goes to block 59. If the rack time is exceeded the valves are de-energized at block 54 and the program goes to block 59. The various models of EMD engines wait a predetermined amount of time depending on the engine model after beginning to crank the engine before de-energizing the valves in the governor. The proper period of time to wait is well known in the art since this program merely simulates a manual operation. If the valves are not energized at 52 the program tests to see if the rack delay time has been reached at 55. The various models of EMD engines wait a predetermined amount of time depending on the engine model after beginning to crank the engine before energizing the valves in the governor. The proper period of time to wait is well known in the art since this program merely simulates a manual operation. If the rack delay time has not been reached at 55 the program goes to block 59. If the rack delay time has been reached at 55, the valves are energized at block 56. If the engine is indicated as being off at block 50 and the crank time is exceeded at block 59, the starting motor is de-energized at block 60. A counter determines whether more than five restarts attempts have been made at block 61. If more than five restart attempts have been made, the pump is stopped and solenoid(s) de-energized at 62 and a signal failure alarm is activated at 64. If fewer than five restart attempts have been made, after a predetermined cool down time (well known in the art)(block 66), the initiate start sequence starts over again to a maximum of five attempts.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of overriding an EMD locomotive engine crankcase pressure protective device comprising the steps of:
   a) preventing airflow to the engine crankcase pressure protective device for a predetermined period of time during auto start to prevent the engine crankcase protective device from actuating and automatically shutting down the engine.

2. The method of claim 1 in which the airflow is prevented by means of a normally open valve which is closed during auto start to prevent the airflow from actuating and automatically shutting down the engine.

3. The method of claim 2 in which the predetermined period of time during which the normally open valve is closed is approximately one minute.

4. The method of claim 3 further including the step of opening the normally open valve after the predetermined period of time to enable the crankcase pressure protective device to operate normally once the engine is running.

5. A method of overriding an EMD locomotive engine low water protective device comprising the steps of:
   a) blocking the airflow to the low water protective device for a predetermined period of time during auto start to prevent the low water protective device from actuating and automatically shutting down the engine.

6. The method of claim 5 in which the airflow is blocked by means of a three-way valve installed on the air box line which is opened during auto start to block airflow to the protective device and bleed off the air box pressure inside the low water protective device thereby preventing the airflow from actuating and automatically shutting down the engine.

7. The method of claim 6 in which the predetermined period of time during which the valve is opened is approximately one minute.

8. The method of claim 7 further including the step of closing the valve after the predetermined period of time to enable the low water protective device to operate normally once the engine is running.

9. A method of overriding an EMD locomotive engine crankcase pressure protective device and low water protective device comprising the steps of:
   a) preventing the airflow to the engine crankcase pressure protective device for a predetermined period of time during auto start to prevent the engine crankcase protective device from actuating and automatically shutting down the engine, and
   b) blocking the airflow to the low water protective device for a predetermined period of time during auto start to prevent the low water protective device from actuating and automatically shutting down the engine.

10. The method of claim 9 in which the airflow to the engine crankcase pressure protective device is prevented by means of a three-way valve which is closed during auto start to prevent the airflow from actuating and automatically shutting down the engine, and in which the airflow to the low water protective device is blocked by means of a normally closed valve installed on the air box line which is opened during auto start to block airflow to the protective device and bleed off the air box pressure inside the low water protective device thereby preventing the airflow from actuating and automatically shutting down the engine.

11. The method of claim 10 in which the predetermined period of time during which the normally open valve is closed and the three-way valve is open is approximately one minute.

12. The method of claim 11 further including the step of opening the normally open valve after the predetermined period of time to enable the crankcase pressure protective device to operate normally once the engine is running, and of closing the three-way valve after the predetermined period of time to enable the low water protective device to operate normally once the engine is running.

13. Apparatus for overriding an EMD locomotive engine crankcase pressure protective device during auto start, of the type having a diaphragm which is moved by positive pressure being built up in the crankcase thereby causing air to move through the vent line, actuating the pressure detector and causing the engine to shutdown, the improvement comprising:
   a) means for preventing the airflow to the engine crankcase pressure protective device for a predetermined period of time during auto start to prevent the engine crankcase protective device from actuating and automatically shutting down the engine.

14. The apparatus of claim 13 wherein the means is comprised of a two-way valve which is electronically energized and de-energized.

15. The apparatus of claim 14 in which the predetermined amount of time is approximately one minute.

16. Apparatus for overriding an EMD locomotive engine low water protective device during auto start, of the type having a diaphragm which is moved when the differential pressure across the water pump becomes less than the air box pressure, actuating the low water detector and causing the engine to shutdown, the improvement comprising:
   a) means for blocking the airflow to the low water protective device for a predetermined period of time during auto start to prevent the low water protective device from actuating and automatically shutting down the engine.

17. The apparatus of claim 16 wherein the means is comprised of a three-way valve which is electronically energized and de-energized.

18. The apparatus of claim 17 in which the predetermined amount of time is approximately one minute.

* * * * *